J. W. REGER.
MACHINE ELEMENT.
APPLICATION FILED SEPT. 22, 1915.
1,176,601. Patented Mar. 21, 1916.
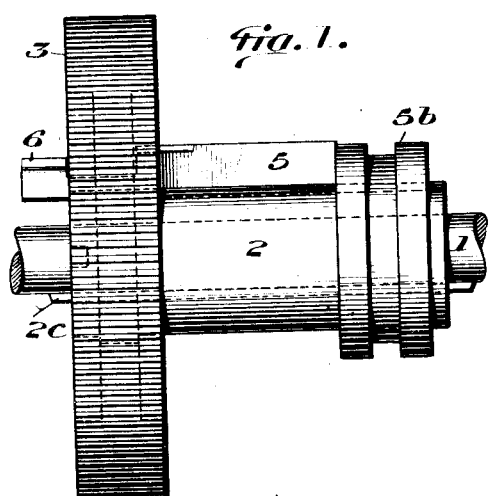
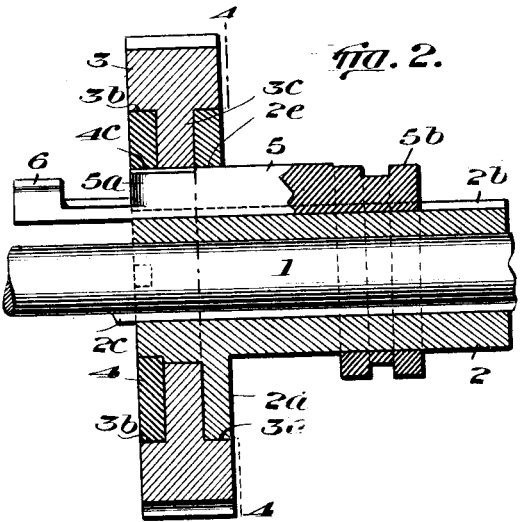
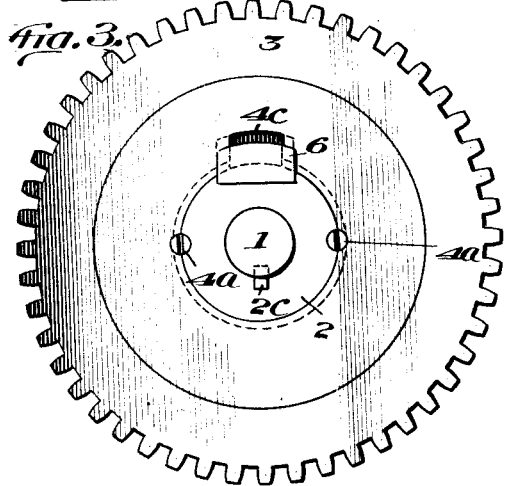
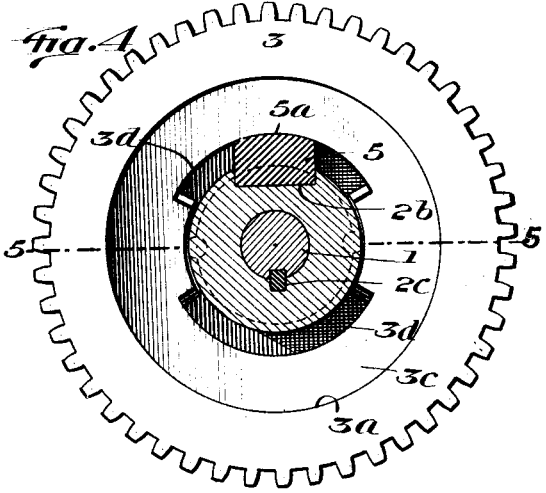
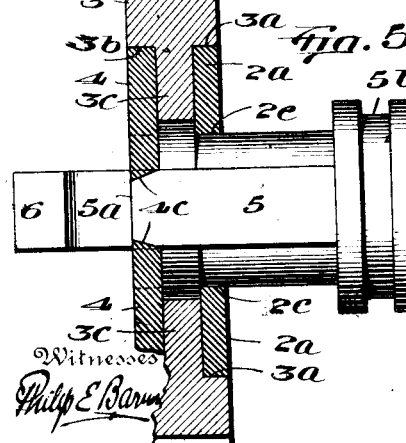
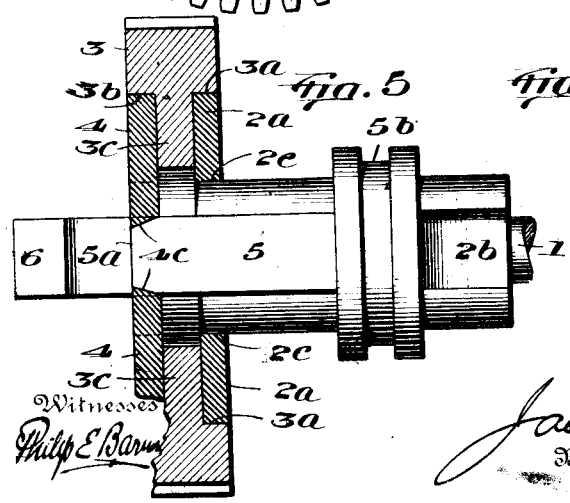
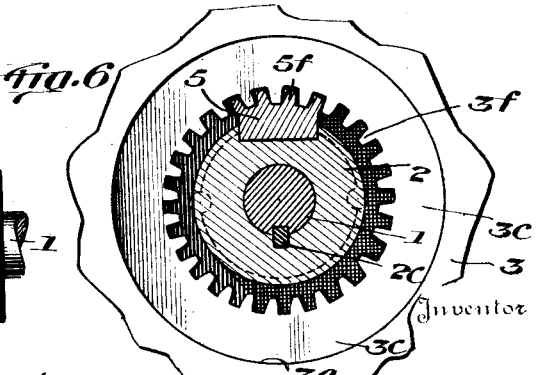

UNITED STATES PATENT OFFICE.

JACOB W. REGER, OF MILAN, MISSOURI, ASSIGNOR OF ONE-THIRD TO SAMUEL L. MATKINS AND ONE-THIRD TO CHARLES H. MURDOCK, OF BOYNTON, MISSOURI.

MACHINE ELEMENT.

1,176,601.  Specification of Letters Patent.   Patented Mar. 21, 1916.

Application filed September 22, 1915. Serial No. 52,076.

*To all whom it may concern:*

Be it known that I, JACOB W. REGER, a citizen of the United States, residing at Milan, in the county of Sullivan and State of Missouri, have invented certain new and useful Improvements in Machine Elements; and I hereby declare that the following is a full, clear, and exact description thereof, reference being had to the accompanying drawings, which form part of this specification.

This invention is an improvement in machine elements and it consists in novel means for supporting a gear or other member upon a shaft, and for locking this gear to the shaft when desired, or freeing it therefrom so that it can run idly, and the particular object of the invention is to provide means for rotatably supporting a gear or rotatable member upon a shaft without direct contact therewith so that the interior notches or clutch portions of such member do not contact with the shaft, and do not have any rubbing or rotary frictional contact with the shaft or the support upon which the gear is mounted, and whereby the strength of the shaft may be reinforced at the point at which the gear or member is supplied.

The invention is particularly designed for use where it is desired to mount a gear or rotatable member upon a shaft of small diameter, without impairing the strength of the shaft.

I will explain the invention in connection with the accompanying drawings, which illustrate a practical embodiment thereof and will enable others to understand how to construct and use the same, and the claims summarize the essential features of the invention for which protection is desired.

In said drawings: Figure 1 is a side elevation of the complete device; Fig. 2 is a longitudinal section thereof; Fig. 3 is a front elevation; Fig. 4 is a transverse section on line 4—4 of Fig. 2; Fig. 5 is a section on line 5—5 of Fig. 4; Fig. 6 is a detail sectional view showing a slight modification.

Referring to said drawings, 1 designates the shaft upon which I desire to mount the gear or disk and which may be the shaft of an automobile engine. Upon this shaft is fitted a sleeve 2 which may be fastened to the shaft 1 by any suitable means, a key $2^c$ being indicated in the drawings. The sleeve is closely fitted to the shaft so as to reinforce the same. The sleeve is provided near one end with an annular flange $2^a$ of larger diameter than the sleeve; and the sleeve is provided with a longitudinal groove $2^b$ in its outer side. The gear, disk or other rotatable object to be mounted upon the shaft, a gear 3 being shown, has an axial opening of larger diameter than the sleeve 2 and is provided on its opposite faces with annular recesses $3^a$ and $3^b$ of larger diameter than the axial opening. The recess $3^a$ is adapted to receive and fit over the flange $2^a$, and the recess $3^b$ is adapted to receive and fit over an annular collar 4 which is fitted upon the shouldered end of the sleeve 2 adjacent the flange $2^a$ and may be fixedly but detachably secured to the sleeve by means of screws or keys $4^a$, as indicated in the drawings.

The web portion $3^c$ of the gear 3 lies between the collar 4 and flange $2^a$ and has a neat but not close fit against the faces thereof, but the peripheral surfaces of the recesses $3^a$, $3^b$, have a running fit upon the opposed peripheries of the flange $2^a$ and collar 4 so that the gear or member 3 is thus rotatably mounted upon the flange $2^a$ and the collar 4, and while free to rotate thereon, is held from longitudinal movement relatively to the sleeve 2. The web $3^c$ is preferably provided with a plurality of notches or slots $3^e$ with any one of which a projection or tooth $5^a$ on a slide 5 mounted in the groove $2^b$ is adapted to engage. This slide 5 may be shifted longitudinally of the sleeve by any suitable means, and as shown is connected to an annular grooved collar $5^b$ which surrounds the sleeve 2, as indicated in Fig. 1, and can be operated by any suitable shifter. The flange $2^a$ is provided with an opening or slot $2^e$ for the passage of the slide 5. The slide 5 may be projected beyond the sleeve and through the axial opening in the gear and an opening $4^c$ in collar 4, as shown in Fig. 2, and has on its outer end a lug 6 which when the slide is retracted will engage the outer side of collar 4 and arrest the slide when the projection or tooth 5ᵃ is entirely disengaged from the gear notches and then the gear is free to rotate upon the sleeve as described.

It will be seen that when the slide 5 is engaged with one of the notches 3ᵉ the member 3 is locked to the sleeve 2 and may be rotated therewith, and if the shaft 1 be the driving member the member 3 will then be rotated therewith. If the member 3 be the driving member, then the shaft 1 will be rotated with the said member when the key is engaged with one of the notches 3ᵉ as indicated in Fig. 4. It will also be observed that when the slide is disengaged from the member 3 said member is free to rotate upon the flange 2ᵃ and collar 4 and has no bearing upon the shaft nor does its inner web portion have any direct bearing upon the shaft or sleeve. By means of this invention I am enabled to apply a gear or rotatable member to a small shaft and lock it to or release it from, the shaft at will by simply shifting slide 5, and the invention can be easily adapted or applied to a small shaft without weakening the shaft, and indeed it will strengthen same at the point at which the gear is mounted, for the gear is journaled upon the flange and collar on the sleeve which practically forms a long bearing supporting the gear on the shaft, and the sleeve also stiffens the shaft at the point where the strain of transmission of power between the member 3 and the shaft is applied. If desired instead of the notches 3ᵉ the inner periphery of the web 3ᶜ might be toothed as indicated at 3ᶠ in Fig. 6 and the slide 5 might be provided with one or more teeth 5ᶠ adapted to engage any one of the teeth 3ᶠ to lock the gear to the sleeve.

Claims.

1. In combination, a shaft, a sleeve mounted thereon having a circumferential annular portion projecting therefrom and a member rotatably mounted upon the periphery of said annular portion, and having a web portion with an axial opening and means adapted to engage non-rotatively the web of said rotary member and lock the same to the sleeve.

2. In combination, a shaft, a sleeve thereon having a circumferential annular portion, a member rotatably mounted upon the periphery of said portion and having a web portion lying beside said portion and means adapted to engage non-rotatively the web portion of the said member to lock the same to the sleeve when said means is in one position, and in another position of the means to leave the member free to rotate upon said portion.

3. In combination, a shaft, a sleeve thereon having a circumferential annular portion and a longitudinal groove, a gear or member rotatably mounted upon the periphery of said portion and having a web portion lying beside said portion, and a slide in said groove adapted to engage the web portion of the said member to lock the same to the sleeve when the slide is in one position, and in another position of the slide to leave the member free to rotate upon said portion.

4. In combination, a shaft, a sleeve thereon having an annular flange, a collar attached to the sleeve adjacent the flange, a member rotatably mounted upon the periphery of said collar and flange and having a web portion lying between the collar and flange, and a means adapted to engage the web portion of the said member to lock the same to the sleeve.

5. In a combination, a shaft, a sleeve thereon having an annular flange and a longitudinal groove, a collar attached to the sleeve adjacent the flange, a member rotatably mounted upon the periphery of said collar and flange and having a web portion lying between the collar and flange, a slide in said groove having a projection adapted to engage the notches in the web portion of the said member to lock the same to the sleeve when the slide is in one position, and in another position to leave the member free to rotate upon said collar and flange.

6. In combination, a shaft, a sleeve fixed thereon having an annular flange adjacent one end, and a longitudinal groove, said flange being provided with an opening in line with the groove of the sleeve, a member rotatably mounted upon the periphery of said flange and having a web portion extending beside the flange, said web having its inner periphery notched or toothed, and a slide fitted in said groove and extending through said flange and provided with a tooth or projection adapted to engage the notch or teeth of the web in one position to lock the member to the sleeve, and in another position to free the member so it can rotate upon said flange and collar, and means to limit the retraction of the slide, substantially as described.

7. In combination, a shaft, a sleeve fixed thereon having an annular flange adjacent one end and a longitudinal groove, a collar fast to the sleeve adjacent the said flange but spaced therefrom, said flange and collar being provided with openings in line with the groove of the sleeve, a gear or rotatable member rotatably mounted upon the peripheries of said flange and a collar and having a web portion extending beside the flange, said web having its inner edge notched or toothed, a slide fitted in said groove and extending through said collar and flange and provided with a tooth or projection adapted to engage the notch or tooth of the web and when in one position to lock the member to the sleeve, and in another position to free the member so it can rotate upon said flange and collar, said slide having a lug on its outer end adapted to limit the retraction of the slide, substantially as described.

In testimony that I claim the foregoing as my own, I affix my signature in presence of two witnesses.

JACOB W. REGER.

Witnesses:
SAMUEL L. MATKINS.
C. H. MURDOCK.

Copies of this patent may be obtained for five cents each, by addressing the "Commissioner of Patents, Washington, D. C."